W. J. ROBB & W. H. WELCH.
INTERNAL COMBUSTION ENGINE.
APPLICATION FILED APR. 30, 1910.

1,033,939.

Patented July 30, 1912.

7 SHEETS—SHEET 2.

W. J. ROBB & W. H. WELCH.
INTERNAL COMBUSTION ENGINE.
APPLICATION FILED APR. 30, 1910.

1,033,939.

Patented July 30, 1912.

7 SHEETS—SHEET 3.

Witnesses
M. H. Darg.
L. A. Price

Inventors
William J. Robb
Walter H. Welch
By Wm. E. Boulter,
attorney

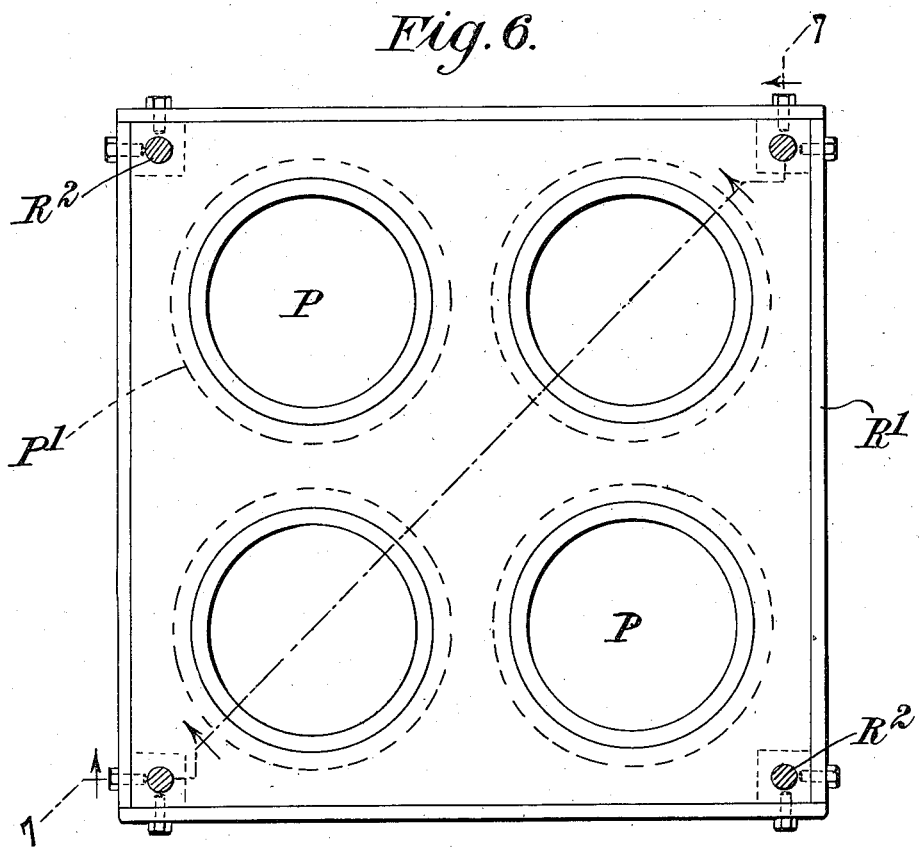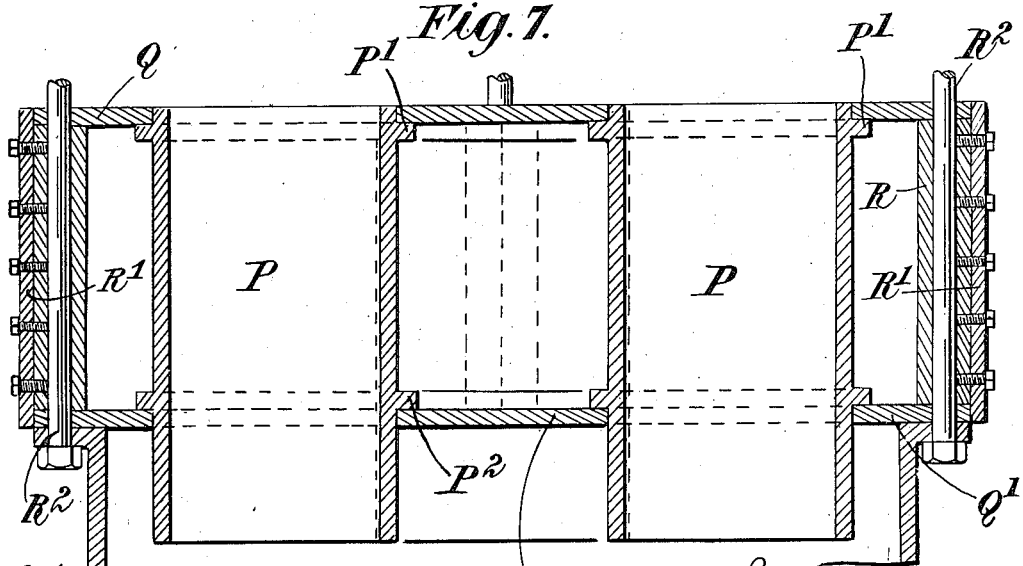

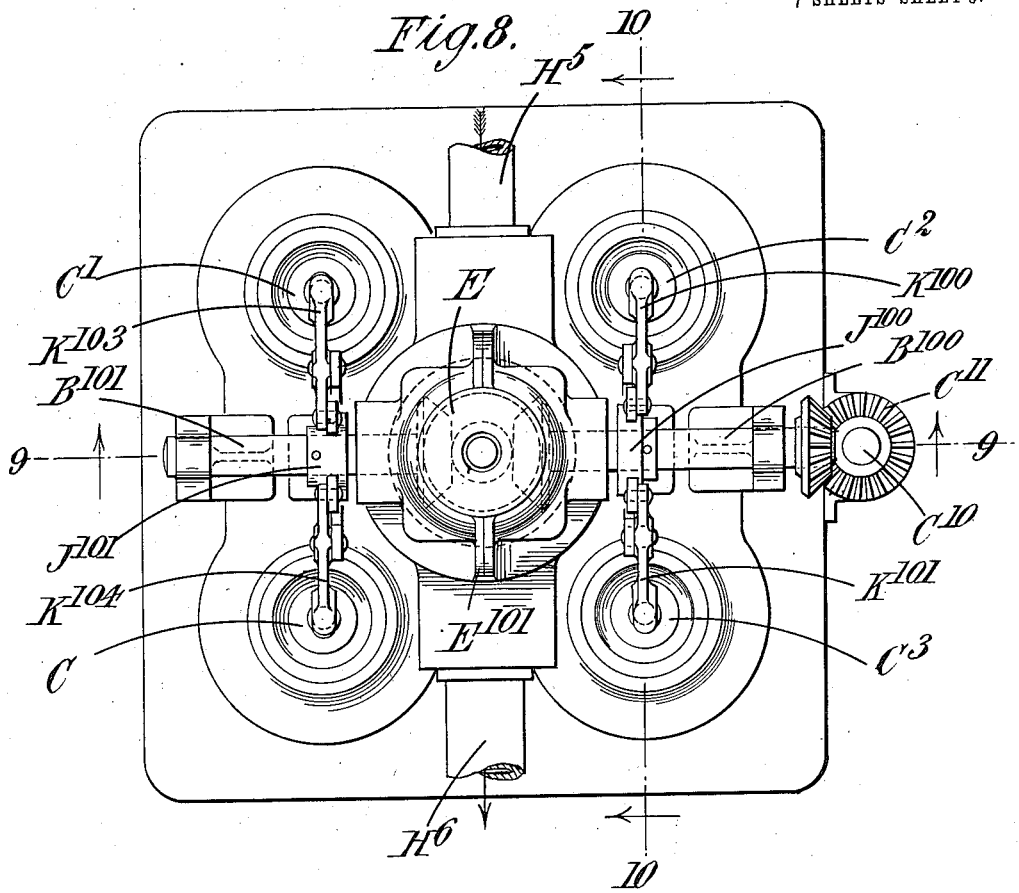
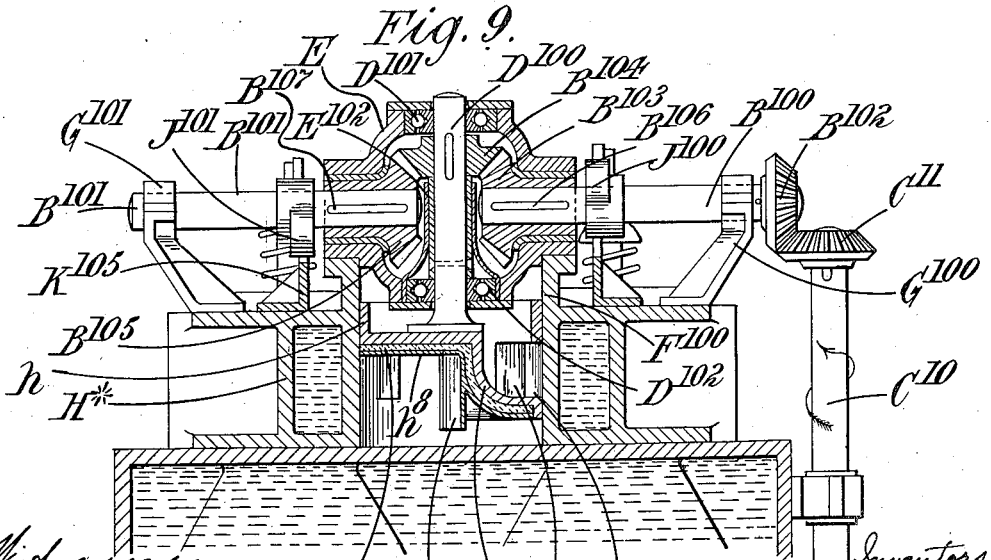

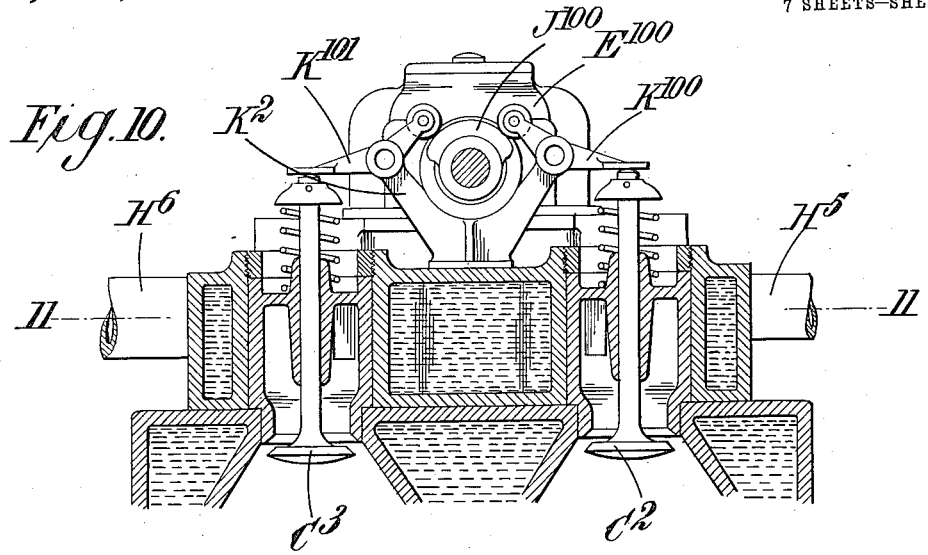
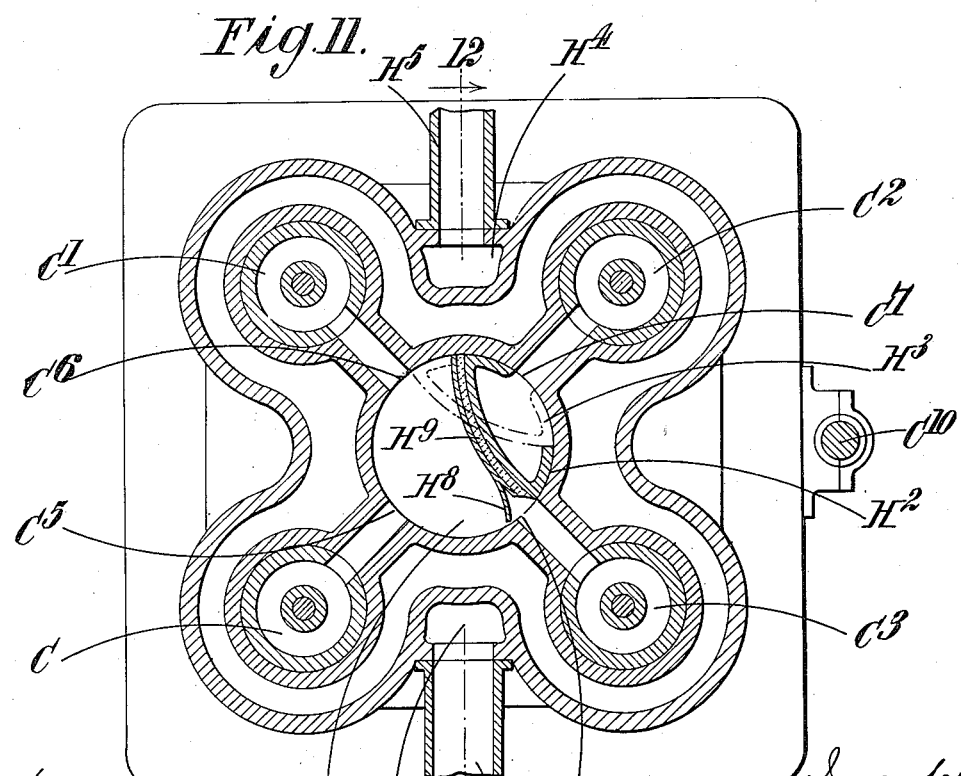

W. J. ROBB & W. H. WELCH.
INTERNAL COMBUSTION ENGINE.
APPLICATION FILED APR. 30, 1910.

1,033,939.

Patented July 30, 1912.
7 SHEETS—SHEET 7.

Witnesses
M. W. Darg
L. A. Price

Inventors
William J. Robb
Walter H. Welch
By Wm E. Boulster
Attorney

UNITED STATES PATENT OFFICE.

WILLIAM JOHN ROBB AND WALTER HENRY WELCH, OF BRISTOL, ENGLAND, ASSIGNORS TO BANNER MOTORS LIMITED, OF BRISTOL, ENGLAND.

INTERNAL-COMBUSTION ENGINE.

1,033,939. Specification of Letters Patent. Patented July 30, 1912.

Application filed April 30, 1910. Serial No. 558,661.

*To all whom it may concern:*

Be it known that we, WILLIAM JOHN ROBB and WALTER HENRY WELCH, subjects of the King of England, both residing at Bristol, England, have invented certain new and useful Improvements in Internal-Combustion Engines, of which the following is a specification.

This invention is for improvements in or relating to internal combustion engines and has for its object to provide a compact balanced engine of the beam type in which the various parts shall be readily accessible, the whole being moreover so constructed as to be light without sacrificing strength or rigidity.

The invention consists in the general construction of the engine and its operative parts and will be readily understood by reference to the accompanying drawings, wherein—

Figure 1:
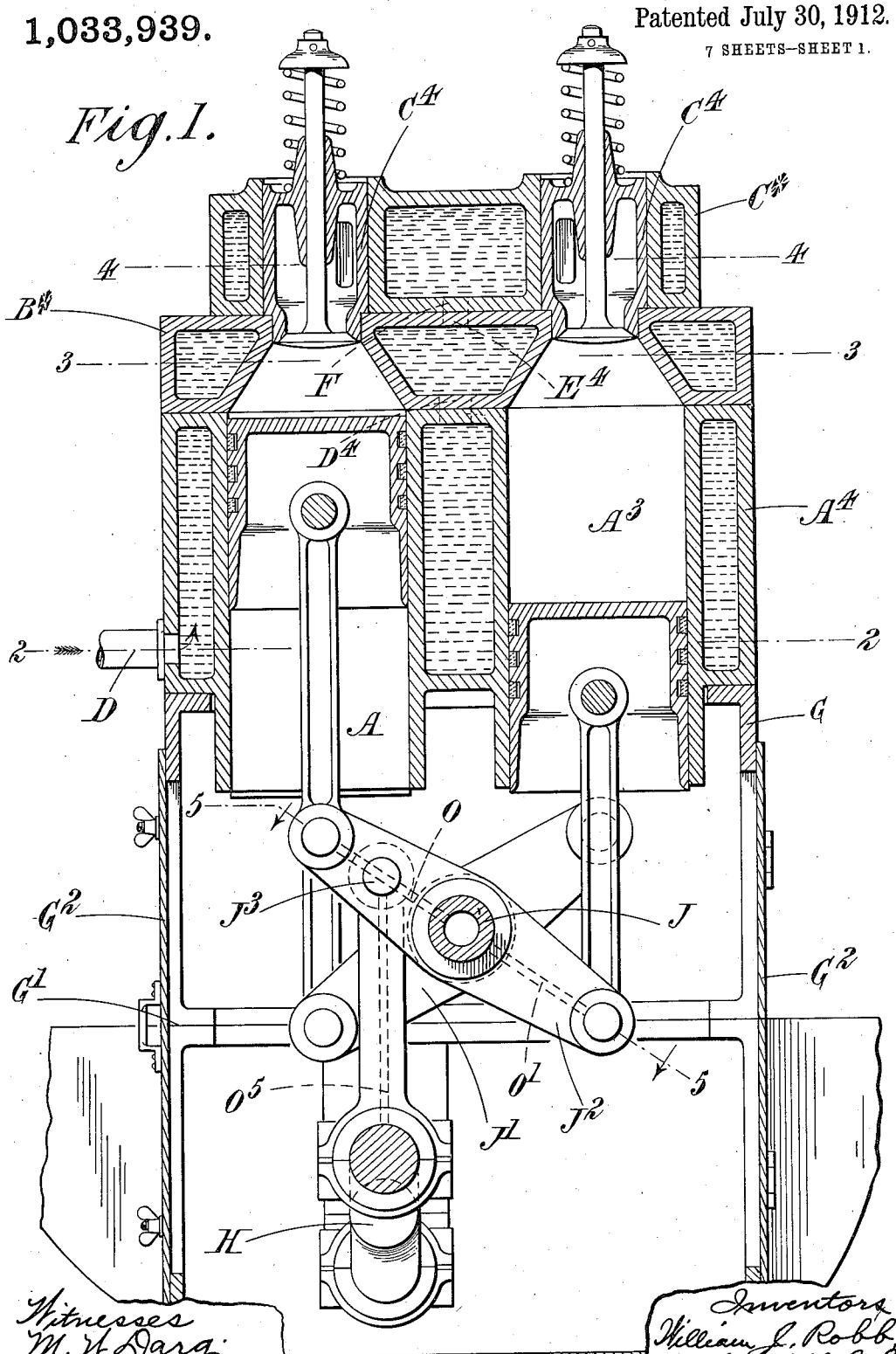
Figure 2:
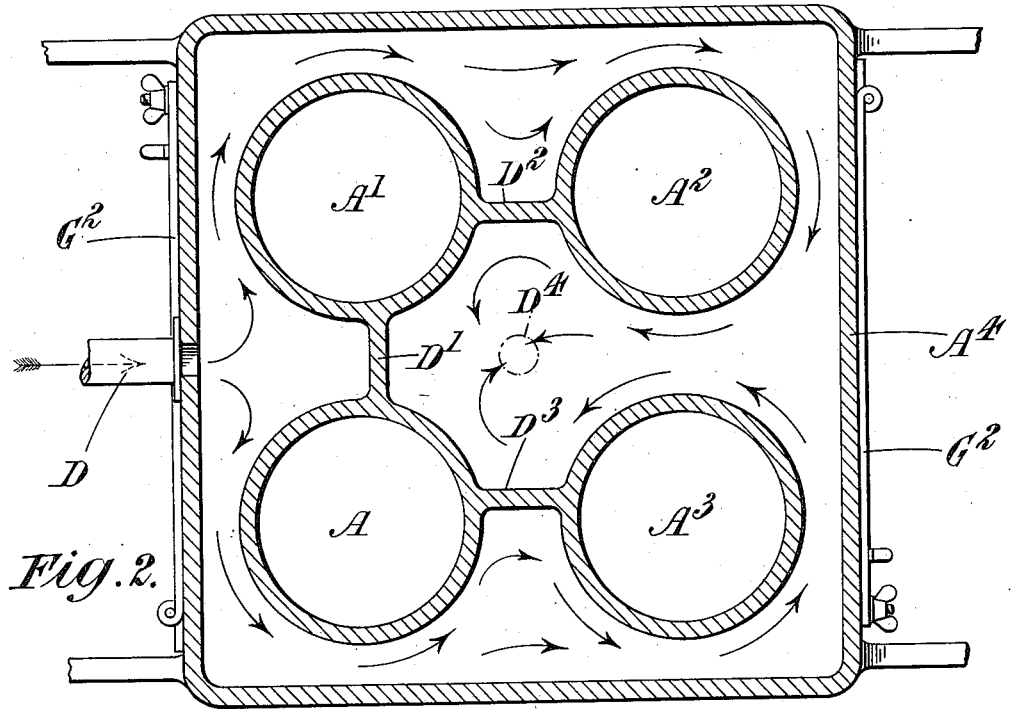
Figure 3:
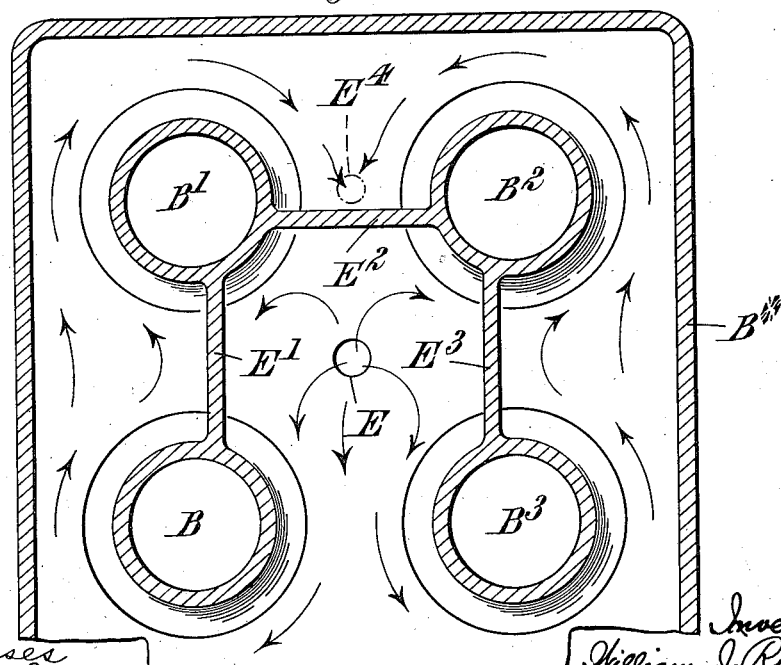
Figure 4:
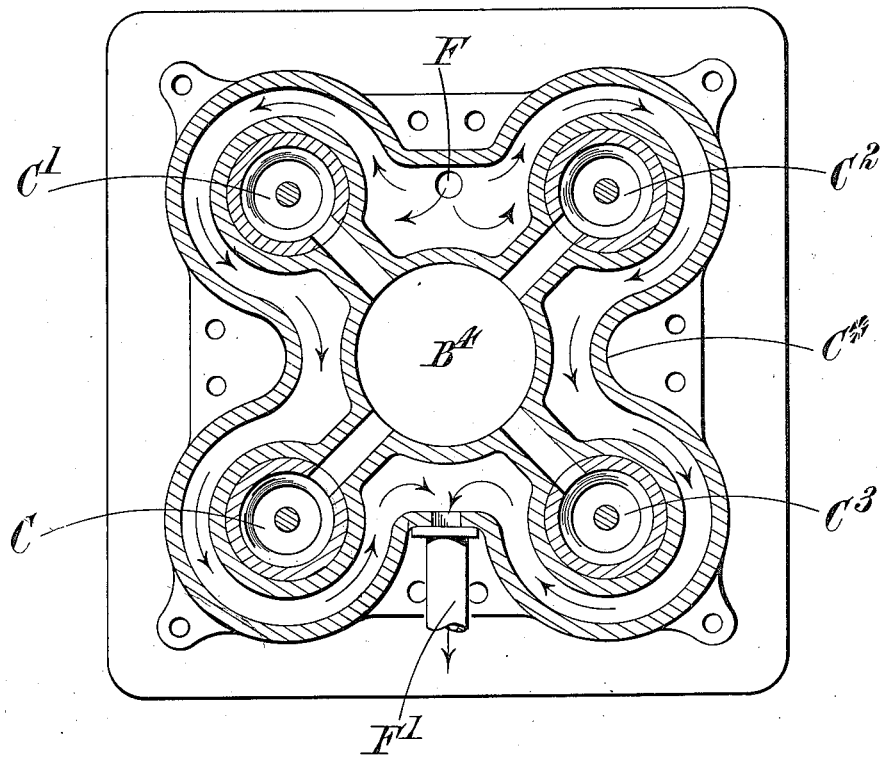
Figure 5:
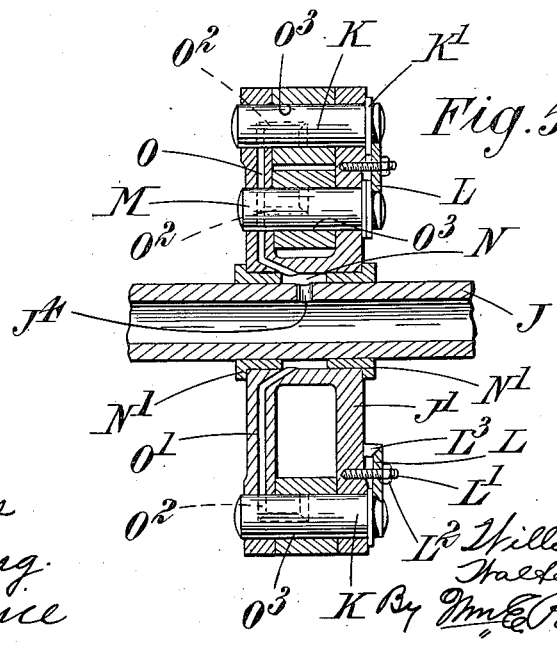
Figure 12:
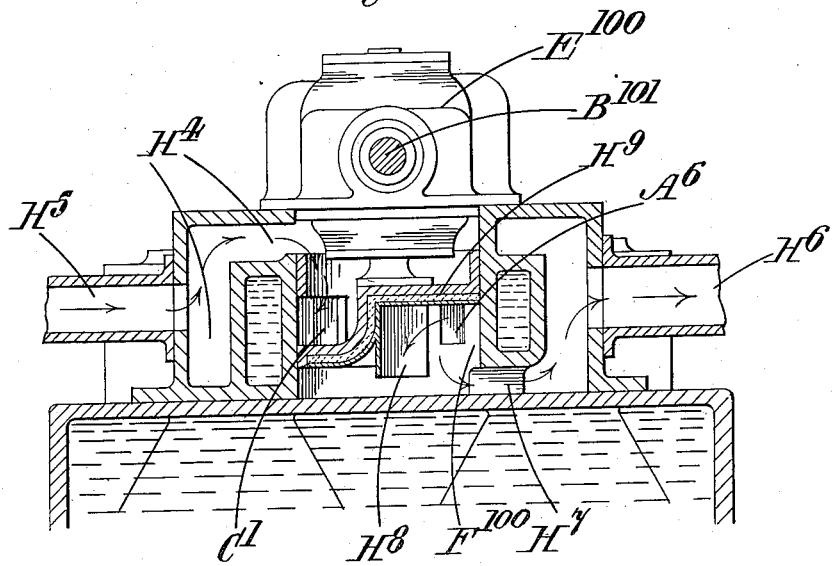
Figure 13:
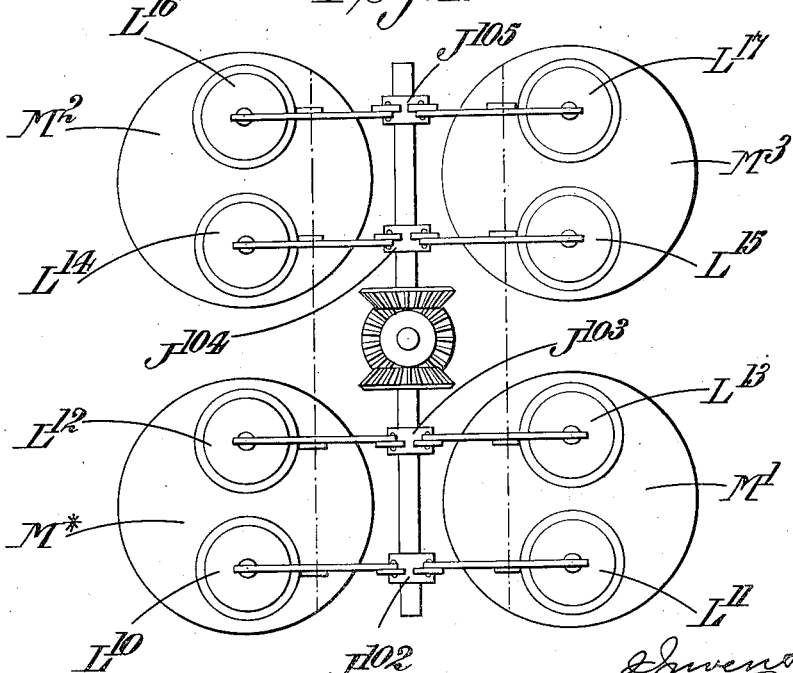

Figure 1 is a central vertical section through the two front cylinders of an engine constructed according to this invention, part of the valve mechanism being, however, omitted for the sake of clearness; Fig. 2 is a transverse section through the engine on the line 2—2 of Fig. 1; Fig. 3 is a transverse section through the engine on the line 3—3 of Fig. 1; Fig. 4 is a transverse section through the engine on the line 4—4 of Fig. 1; Fig. 5 is a section through the rocking-beam on the line 5—5 of Fig. 1; Fig. 6 is a plan of the cylinders and water-jacket constructed according to a modified method of carrying out this invention; Fig. 7 is a section through the parts shown in Fig. 6 on the line 7—7; Fig. 8 is a plan of the complete valve mechanism omitted from Fig. 1; Fig. 9 is a section of the valve mechanism on the line 9—9 of Fig 8; Fig. 10 is a section on the line 10—10 of Fig. 8; Fig. 11 is a section through the valve mechanism on the line 11—11 of Fig. 10; Fig. 12 is a section through the valve mechanism on the line 12—12 of Fig. 11, and Fig. 13 shows diagrammatically a modified arrangement of the valve mechanism.

Like letters indicate like parts throughout the drawings.

The engine is provided with four cylinders A A' A² A³ surrounded by a square water jacket A⁴. The water jacket and cylinders may be cast in one piece or built together as
found convenient but the top is constructed
to receive a hollow combustion plate B*. This plate is also square and has formed in it the combustion chambers B B' B² B³ which register with the bores of the cylinders A A' A² A³ and the plate is detachably secured by any convenient means to the cylinder section of the engine.

Above the combustion plate is a second hollow plate C* wherein valves C C' C² C³ are mounted. This plate is also detachably secured in place and one valve is appropriated to each of the combustion chambers formed in the plate B*. In the center of the valve plate is a circular chamber B⁴ to receive a distributing valve whereby the inlet and the exhaust may be alternately connected to the different valves; a particular type of valve for this purpose is hereinafter described.

By making the valve plate detachable from the combustion chamber plate and this again detachable from the cylinder section of the engine all these parts can be readily got at and they moreover lend themselves to the adoption of a very convenient form of water circulation. To obtain the water circulation the inlet D for the water is provided at one side of the cylinder water-jacket as shown in Figs. 1 and 2 and baffles D' D² D³ are formed or provided between the cylinders so that the water is forced to take the course indicated by the arrows, Fig. 2. The cylinder water-jacket is provided with an outlet D⁴ in its upper face which is centrally situated with relation to the cylinders, and registering with the outlet is an orifice E (Fig. 3) in the lower side of the hollow combustion chamber plate. The combustion-chamber plate is divided up in a similar manner to the cylinder water-jacket by baffles E' E² E³ so that the water has to circulate from the center around the cylinders to the opposite side of the baffle E² where an outlet orifice E⁴ is provided in the upper wall of the hollow plate. Registering with this outlet is an inlet orifice F in the lower wall of the valve plate C* (Fig. 4). This plate is divided up by the central chamber B⁴ and radial webs that extend thence to the valve pockets and in which the conduits for communicating between the space B⁴ and the valve pockets are formed. The outlet F' is placed on the opposite side of the valve plate from the inlet F so that the water has to travel around all the valve pockets in the direction indicated by the arrows before it can escape from the valve plate. Each valve is conveniently carried in a detachable cage or valve box $C^4$.

The cylinder section of the engine has secured to it a crank case G that is divided at G' along a plane parallel to but not passing through the crank shaft H. The crank shaft is mounted in the lower half of the crank-case and in the upper half bearings are provided for a beam-supporting-shaft J. The bearings for the crank shaft H are mounted in recesses in the crank-case; this permits the whole shaft to be lifted out when the two parts of the case have been separated. On the shaft J two beams J' $J^2$ are carried, the shaft being stationary and the beams being arranged to rock thereon. The beam J' is connected to the pistons of the cylinders A' $A^2$ and the beam $J^2$ is connected to the pistons of the cylinders A $A^3$. The connecting-rod from each beam to the crank shaft is pivoted to its beam by a pin $J^3$ situated approximately midway between the shaft J and the point of connection between the end of the beam and the piston rod. This arrangement gives a compact form of engine with a comparatively small crank throw. It will be seen that the crank-shaft lies in a plane that passes approximately midway between the end of the beam and the beam-shaft. The crank-case may be secured to the cylinder section of the engine by any convenient means and the two portions of the crank-case may be connected together as found convenient, these details forming no part of the present invention.

On each side of the crank-case is a door $G^2$ which gives access to the crank-shaft with the beams and other parts in the crank-case. If it is desired to separate the upper and lower parts of the crank-case the crank-shaft connecting rods can be disconnected from the beams by withdrawing the pins $J^3$ thus allowing the two parts of the crank-case to be separated after they have been disconnected.

In Fig. 5 a convenient means is shown for securing the pins in place that hold the connecting rods to the beam. At each end of the beam is a pin K to receive the connecting rods for the pistons and each pin has at one end a flange K'. This flange prevents the pin from being pushed through the beam and to prevent its withdrawal a locking plate L is secured to the beam by a screw-threaded stud L' and nut $L^2$. The plate L is beveled and that side of the pin which is toward the plate is also beveled. Where there is only one pin as at the lower end of Fig. 5 a beveled edge of the plate rests on the bevel of the pin and the other edge of the plate rests upon a beveled stop $L^3$, but where two pins are provided side by side as with the pin K at the top of Fig. 5 and the pin M which receives the connecting rod for the crank-shaft the beveled edge of the plate L rests upon the beveled portions of the two pins, so that one plate serves to hold both pins in position. It will be seen that with this arrangement the pins can neither rotate nor be accidentally withdrawn.

For lubricating purposes the shaft J is made hollow and has in its wall an orifice $J^4$ which provides communication between the hollow interior of the shaft and an annular recess N that is formed between two bushes N' whereon the beam rocks. The beam is bored through lengthwise in opposite directions as shown at O and O' these ways extending from the annular recess N to the pins M and K. Each pin is also bored as shown at $O^2$ to form a way that extends from the conduits O O' to the bearing surfaces $O^3$ of the connecting rods. It will be seen that this arrangement affords an efficient means of lubrication as oil admitted to the interior of the hollow shaft J can pass freely through the beam to all of the pins and the members which move upon them. The rods which connect the beams to the crank-shaft are also bored through as shown at $O^5$, Fig. 1, and thus the oil finds its way from the pin M through the connecting rod to the crank.

In Figs. 6 and 7, a convenient method is shown for building up the cylinders and water-jacket. Each cylinder P has shoulders P' $P^2$ at its upper and lower ends respectively. On the shoulders P' a square plate Q is made to rest and the edges of the plate extend beyond the shoulders P' as clearly shown in the drawings. A second plate Q' rests on the shoulders $P^2$ and the cylinders and at the corners of the plates distance sleeves or pillars R are placed. Side plates R' are bolted to these distance sleeves or pillars and thus a water-jacket is built up around the cylinders. Tie bolts $R^2$ may be passed through the sleeves R and through a combustion plate and valve plate so that all these parts can by their means be secured together.

Any convenient valve mechanism may be employed for operating the valves C C' $C^2$ $C^3$, but they are preferably employed in conjunction with a central rotary valve hereinafter described with reference to Figs. 8–12.

The valves C C' $C^2$ $C^3$ are allotted, as already described, one to each cylinder and disposed at the corners of a square. For operating them a divided cam-spindle $B^{100}$ $B^{101}$ is employed. The two parts of the cam-spindle are axially alined and lie between the valves C' $C^2$ and $C^3$ C in such manner that two valves lie on opposite sides of each spindle portion, that is the valves $C^2$ $C^3$ lie on opposite sides of the spindle portion $B^{100}$ and the valves $C'$ $C$ lie on opposite sides of the spindle portion $B^{101}$. On the outer end of the cam-spindle portion $B^{100}$ is a bevel wheel $B^{102}$. This meshes with a bevel wheel $C^{11}$ on a shaft $C^{10}$, whereby motion is imparted to the cam-spindle. The inner ends of the cam-spindle portions are not close together but are operatively connected by bevel wheels $B^{103}$ $B^{104}$ $B^{105}$. A wheel $B^{103}$ is carried on the inner end of the spindle portion $B^{100}$ and is engaged therewith by a feather $B^{106}$. The wheel $B^{104}$ is carried on a spindle $D^{100}$ that lies between the ends of the spindle portions $B^{100}$ $B^{101}$ and whose axis is at right angles to that of the cam-spindle. The wheel $B^{105}$ is carried on the inner end of the spindle portion $B^{101}$ and is engaged therewith by a feather $B^{107}$. Surrounding the wheels $B^{103}$ $B^{104}$ $B^{105}$ is a housing or casing $E^{100}$ which is secured over a central valve-chamber $F^{100}$. The casing $E^{100}$ provides a bearing for the inner end of the cam-spindle portion $B^{100}$ and the outer end is supported by a bracket $G^{100}$. In a similar manner the inner end of the spindle portion $B^{101}$ is supported by the casing $E^{100}$ and the outer end by a bracket $G^{101}$.

In the valve chamber $F^{100}$ below the housing $E^{100}$ is a rotary valve that comprises a diaphragm $H^*$ which divides the valve chamber into two parts; these may for convenience be called the upper and lower portions of the chamber. The diaphragm has on one side an upwardly directed flange or lip $h$ and on the other a lug or pocket $H'$ whereof one face $H^2$ bears against the wall of the valve chamber. In the wall of the valve chamber are four ports $C^5$ $C^6$ $C^7$ $C^8$, which communicate with the spaces above the valves $C$ $C'$ $C^2$ $C^3$ respectively. In the face $H^2$ of the lug $H'$ of the rotary valve is a port $H^3$ that registers with the ports $C^5$ $C^6$ $C^7$ and $C^8$ in turn as the valve $H^*$ rotates. The port $H^3$ in the lug $H'$ of the valve has free communication with the upper portion of the valve chamber $F^{100}$ and communicating with this upper portion at $H^4$ is an inlet conduit $H^5$; an exhaust conduit $H^6$ communicates with the lower portion of the valve chamber $F^{100}$ at $H^7$.

Secured to the valve $H^*$ is a shield $h^8$. This lies on that side of the valve against which the gases of combustion impinge and between it and the valve face is a heat insulating layer $H^9$ that may take the form of an asbestos packing piece. Depending from the shield $h^8$ is a baffle $H^8$ which lies between the exhaust port of one cylinder and that port whose cylinder has previously commenced to exhaust. In Fig. 11 the baffle is shown as between the ports $C^5$ and $C^8$.

The spindle $D^{100}$ of the reversing wheel $B^{104}$ is utilized to carry and drive the rotary valve $H^*$. The spindle is mounted in ball bearings $D^{101}$ $D^{102}$ that may be supported by any convenient means in the casing $E^{100}$. This casing $E^{100}$ is conveniently divided, as shown at $E^{101}$, Fig. 8, and the two parts may be connected by any convenient means such details forming no part of the present invention.

Extending upwardly from the lower portion of the casing $E^{100}$ and from a point outside the ball bearing $D^{102}$ is a conical shell $E^{102}$. This reaches approximately to the wheel $B^{104}$ and enables lubricant to be introduced into the casing $E^{100}$ without its escaping through the bearing $D^{102}$.

The cam-spindle portion $B^{100}$ carries a cam $J^{100}$ which operates rocking arms $K^{100}$ $K^{101}$ that are supported by a bracket $K^{102}$ and control the valves $C^2$ $C^3$ respectively. The spindle portion $B^{101}$ carries a cam $J^{101}$ which operates rocking arms $K^{103}$ $K^{104}$ which are carried by a bracket $K^{105}$ and control the valve $C$ and $C'$ respectively.

The operation of this mechanism is as follows:—If the shaft $C^{10}$ is rotated in the direction of the arrow shown in Fig. 9, the cam-spindle portion $B^{100}$ will be rotated in such direction that the cam $J^{100}$ will first operate the valve $C^2$ and then the valve $C^3$, but the cam-spindle portion $B^{101}$ will be rotated in the reverse direction so that its cam will first operate the valve $C$ and then the valve $C'$. This arrangement allows the valves $C$ $C'$ $C^2$ $C^3$ to be operated in turn so that their respective cylinders are fired in this order and enables a symmetrical form of gear to be employed, all the rocking arms $K^{100}$ $K^{101}$ $K^{103}$ and $K^{104}$ being similar in shape and being operated from the upper side of the cam-spindle. The rotation of the cam-spindle effects the rotation of the valve $H^*$ by means of the spindle $D^{100}$ and wheel $B^{104}$ so that the port of each valve is alternately put in communication with the exhaust and inlet conduits. In Fig. 11 the port $H^3$ of the valve $H^*$ is shown as registered with the port $C^7$ of the valve $C^2$ so that, when the valve $C^2$ is open, explosive mixture from the upper part of the chamber $F^{100}$ of the valve is freely admitted to the cylinder controlled by the valve $C^2$. The valve $C^2$ has already been opened by the cam $J^{100}$ for exhausting the previous charge and is maintained in the open position by the cam while the valve $H^*$ cuts off the exhaust and throws open the inlet, the valve remaining open until the inlet period is completed; the position of the valve $H^*$ at the commencement of the inlet period is shown in dotted lines in Fig. 11. As the valve $H^*$ continues its rotation, the lug $H$ with its port $H^3$ passes from the port $C^7$ so that this now communicates with the lower portion of the chamber $F^{100}$ of the valve. It follows therefore that as soon as the valve $C^2$ is again opened for exhausting, the exhaust gases escaping from the port $C^7$ pass through the lower part of the chamber $F^{100}$ and make their exist through the passage $H^7$ and conduit $H^6$. The coöperation of the four valves and the rotary valve is the same in each case so that this need not be separately described.

The object of the baffle $H^8$ is to prevent the passage of exhaust gases from an adjacent cylinder to one that has nearly completed exhausting. For instance before the port $C^8$ is covered by the lug $H'$ of the valve $H^*$ the valve $C$ whose port is shown at $C^5$ in Fig. 11, will be opened to commence exhaust and the gases as they escape under some pressure from the port $C^5$ are likely to find their way through the port $C^8$ into the cylinder controlled by the valve $C^3$ as the pressure in this cylinder is much lower and the valve $C^3$ is being held open for the inlet period. The baffle $H^8$, however, is always in the position to check any such action and it also serves to receive the impinging gases so that these do not strike direct upon the lug $H'$ of the valve. The heat insulating layer $H^9$ is between the shield $h^8$ and the valve so that the latter may not become unduly heated but it will be appreciated that by screening the valve to a greater or less degree the latter may be made to keep at such a temperature that it will serve as a vaporizer for heavy or comparatively heavy oils, or by sufficient screening it can be kept cool for light oils.

With the valve construction described above no difficulty is found in keeping the parts sufficiently gas tight and the lug $H'$ being on one side of the valve tends to keep its working face up to the wall of the containing chamber by centrifugal action as the valve rotates and the suction of the cylinders will also operate to the same end. Moreover the valve, as will be observed, is not exposed to explosion pressure.

To obtain access to the rotary valve $H^*$ it is only necessary to slide the cam spindle portion $B^{100}$ and $B^{101}$ to the right and left respectively of Figs. 8 and 9, so that their inner ends may be disengaged from the wheels $B^{103}$ $B^{105}$. The whole housing $E^{100}$ with the wheels contained therein and the valve $H^*$ can then be removed. To allow free movement of the cam spindle $B^{100}$ it may be made to slide through the wheel $B^{102}$, or the shaft $C^{10}$ may be so arranged that it can be lowered clear of the wheel $B^{102}$.

Any convenient means may be provided to keep the parts in place when it is not desired to separate them.

Obviously each cylinder may have two separate valves, one for inlet and the other for exhaust, in which case the divided cam-shaft will control eight valves instead of four, and these may be arranged as shown diagrammatically in Fig. 13. Each cam-shaft portion is then provided with two cams $J^{102}$ $J^{103}$ and $J^{104}$ $J^{105}$, the cam $J^{102}$ operating two exhaust valves $L^{10}$ $L^{11}$ of one pair of cylinders $M^*$ $M'$ and the cam $J^{103}$ the two inlet valves $L^{12}$ $L^{13}$ of the same pair. The cam $J^{104}$ would operate the inlet valves $L^{14}$ $L^{15}$ of the second pair of cylinders $M^2$ $M^3$ and the cam $J^{105}$ the two exhaust valves $L^{16}$ $L^{17}$ of this second pair. In this case it will be understood that the rotary valve is dispensed with.

What we claim as our invention and desire to secure by Letters Patent is:—

1. In an internal combustion engine the combination of four working cylinders arranged with their axes parallel and spaced approximately at the four corners of a square, pistons in the cylinders, pitmen extended therefrom, a transverse shaft at the pitman end of the cylinders in a plane that lies approximately midway between two of the cylinders, two rocking-beams on this shaft, means for operatively connecting the beams and the pitmen, a two-throw crank-shaft that lies in a plane that passes approximately midway between the end of the beam and the beam-shaft, a connecting rod for the crank-shaft pivoted at its other end to one of the beams at a point between the center of oscillation of the beam and the point at which one of the pitmen is pivoted thereto, a second connecting rod for the crank-shaft pivoted at its other end to the second beam at a point between its center of oscillation and the point at which one of the pitmen is pivoted to it, a detachable crank-case, means for lubricating the beams, and a valve mechanism controlling the charging and discharging of the cylinders, substantially as set forth.

2. In an internal combustion engine the combination of four working cylinders arranged side by side and spaced approximately at the four corners of a square, pistons in the cylinders, pitmen extending therefrom, a transverse shaft at the pitman end of the cylinders in a plane that lies approximately midway between two of the cylinders, two independent rocking-beams on this shaft, means for operatively connecting opposite ends of one beam with the pitmen of two cylinders disposed side by side on the opposite sides of the shaft, and means for operatively connecting opposite ends of the other beam to the pitmen of the other two cylinders, a two-throw crank-shaft that lies in a plane that passes approximately midway between the end of the beam and the beam-shaft, a connecting rod for the crank-shaft pivoted at its other end to one of the beams at a point between the center of oscillation of the beam and the point at which one of the pitmen is pivoted thereto, a second connecting rod for the crank-shaft pivoted at its other end to the second beam at a point between the center of oscillation and the point at which one of the pitmen is pivoted to it, substantially as set forth.

3. In an internal combustion engine the combination of, four working cylinders arranged with their axes parallel and spaced approximately at the four corners of a square, pistons in the cylinders, pitmen extending therefrom, a transverse shaft at the pitman end of the cylinders in a plane that lies approximately midway between two of the cylinders, two independent rocking-beams on this shaft, means for operatively connecting opposite ends of one beam with the pitmen of two cylinders disposed side by side on the opposite sides of the shaft, means for operatively connecting opposite ends of the other beam to the pitmen of the other two cylinders, a crank-shaft having two cranks, a connecting-rod that engages one of the cranks at one end and at the other end is pivoted to one of the beams at a point between its center of oscillation and its working end, and a second connecting-rod that engages at one end the second crank and at the other end is operatively connected to the second beam at a point between its center of oscillation and its working end, substantially as set forth.

4. In an internal combustion engine the combination of, four working cylinders arranged with their axes parallel and spaced approximately at the four corners of a square, pistons in the cylinders, pitmen extending therefrom, a hollow transverse shaft at the pitman end of the cylinders in a plane that lies approximately midway between two of the cylinders the shaft having two orifices disposed at different points along its length, two rocking-beams on the shaft each beam being placed over one of the orifices therein and having formed in it a lubricating conduit that communicates with one of the orifices in the shaft, and pins operatively connecting the ends of the beams with the pitmen of the cylinder pistons, the lubricating conduits being extended to the working surfaces of such pins, substantially as set forth.

5. In an internal combustion engine the combination of, four working cylinders arranged with their axes parallel and spaced approximately at the four corners of a square, pistons in the cylinders, pitmen therefor, a hollow transverse shaft at the pitman end of the cylinders in a plane that lies approximately midway between two of the cylinders the shaft having two orifices disposed at different points along its length, two rocking-beams on the shaft each beam being placed over one of the orifices therein and having formed in it a lubricating conduit that communicates with one of the orifices in the shaft, and pins operatively connecting the ends of the beams with the pitmen of the cylinders the lubricating conduit in each beam being extended through each pin from one end to a central position whereby the lubricant can flow to the bearing surface of the pitman held by the pin, substantially as set forth.

6. In an internal combustion engine the combination of, four working cylinders arranged with their axes parallel and spaced approximately at the four corners of a square, pistons in the cylinders, pitmen extending therefrom, a hollow transverse shaft at the pitman end of the cylinders in a plane that lies approximately midway between two of the cylinders the shaft having two orifices disposed at different points along its length, two rocking-beams on the shaft each beam being placed over one of the orifices therein and having formed in it a lubricating conduit that communicates with one of the orifices in the shaft, pins operatively connecting the ends of the beams with the pitmen of the cylinder pistons, the lubricating conduits being extended to the working surfaces of such pins, a crank-shaft having two cranks, a connecting-rod that engages one of the cranks at one end and at the other end is pivoted to one of the beams, such connecting-rod having a lubricating conduit formed in it and extending from the pivot at one end to the crank at the other and communicating at the pivot end with the lubricating conduit in the beam, and a second connecting rod that engages at one end the second crank and at the other end is operatively connected to the second beam, substantially as set forth.

7. In an internal combustion engine the combination of, four working cylinders arranged with their axes parallel and spaced approximately at the four corners of a square, pistons in the cylinders, pitmen extending therefrom, a transverse shaft at the pitman end of the cylinders in a plane that lies approximately midway between two of the cylinders, two rocking-beams on this shaft, pins for operatively connecting the ends of the beams with the pitmen of the cylinder pistons one of such pins having near one end a flange (K') and a flat beveled face on that portion that extends beyond the flange, a clamping plate for the beveled pin beveled at one edge to correspond to the bevel on the pin, and means for detachably securing the plate to the beam with the beveled edge overhanging the flange (K') and engaging the beveled portion of the pin, substantially as set forth.

8. In an internal combustion engine the combination of, four working cylinders arranged with their axes parallel and spaced approximately at the four corners of a square, pistons in the cylinders, pitmen extending therefrom, a crank-case, a transverse shaft carried by the crank-case and disposed in a plane that lies approximately midway between two of the cylinders, two rocking-beams on this shaft, detachable means operatively connecting the four pitmen with the four ends of the beams, a crank-shaft carried by the crank-case and having two cranks, and connecting-rods operatively connecting the beams and cranks the crank-case being divided along a plane that is parallel with the transverse shaft and that passes between such shaft and the crank-shaft, so that the cylinder portion of the crank-case carries the transverse shaft and the other portion the crank-shaft, substantially as set forth.

9. In an internal combustion engine the combination of, four working cylinders arranged with their axes parallel and spaced approximately at the four corners of a square, pistons in the cylinders, pitmen extending therefrom at one end of the cylinders, a transverse shaft at one end of the cylinders in a plane that lies approximately midway between two of the cylinders, two rocking-beams on this shaft, means for operatively connecting the beams and the pitmen, a detachable plate covering that end of the cylinders which is remote from the pitman end and having formed in it the four combustion chambers for the four cylinders, and a second detachable plate for securing over the first plate the said second plate being arranged to receive valves for coöperation with the combustion chambers in the first plate, substantially as set forth.

10. In an internal combustion engine the combination of, four working cylinders arranged with their axes parallel and spaced approximately at the four corners of a square, pistons in the cylinders, pitmen extending therefrom, a transverse shaft at the pitman end of the cylinders in a plane that lies approximately midway between two of the cylinders, two rocking-beams on this shaft, means for operatively connecting the beams and the pitmen, a square water-jacket surrounding the four cylinders, and baffles between the cylinders so arranged that they form three sides of a square and prevent water from passing between the cylinders except on the fourth side, inlet and outlet orifices for water being situated one within the area inclosed by the baffles and the other on that side of the baffles farthest from the open side, substantially as set forth.

11. In an internal combustion engine the combination of, four working cylinders arranged with their axes parallel and spaced approximately at the four corners of a square, pistons in the cylinders, pitmen extending therefrom, a transverse shaft at the pitman end of the cylinders in a plane that lies approximately midway between two of the cylinders, two rocking-beams on this shaft, means for operatively connecting the beams and the pitmen, a square water-jacket surrounding the four cylinders, baffles between the cylinders so arranged that they form three sides of a square and prevent water from passing between the cylinders except on the fourth side, inlet and outlet orifices for water being situated one within the area inclosed by the baffles and the other on that side of the baffles farthest from the open side, a detachable plate covering that end of the cylinders which is remote from the pitman end and having formed in it four chambers registering with the cylinders and water-ways cored around the exterior of these chambers as a whole and then between two of the chambers to a central orifice, a corresponding orifice being situated in the water-way at the point farthest from the first mentioned orifice and one of these orifices being made to register with one of the inlet and outlet orifices in the cylinder-portion when the two parts are butted together, substantially as set forth.

12. In an internal combustion engine the combination of, four working cylinders arranged with their axes parallel and spaced approximately at the four corners of a square, pistons in the cylinders, pitmen extending therefrom, a transverse shaft at the pitman end of the cylinders in a plane that lies approximately midway between two of the cylinders, two independent rocking-beams on this shaft, means for operatively connecting the beams and pitmen, a rotary valve situated at one end of the cylinders and having its axis parallel to and positioned centrally relatively to the axes of the four cylinders, such valve controlling ways that communicate with all of the cylinders, and means for operating the valve, substantially as set forth.

13. In an internal combustion engine the combination of, four working cylinders arranged with their axes parallel and spaced approximately at the four corners of a square, pistons in the cylinders, pitmen extending therefrom, a transverse shaft at the pitman end of the cylinders in a plane that lies approximately midway between two of the cylinders, two rocking-beams on this shaft, means for operatively connecting the beams and pitmen, a rotary valve situated at one end of the cylinders and having its axis parallel and positioned centrally relatively to the axes of the four cylinders, such valve controlling the inlet of fuel to all of the cylinders, means for operating the valve, separate auxiliary valves one for each cylinder, and means for mechanically controlling these separate valves, substantially as set forth.

14. In an internal combustion engine the combination of, four working cylinders arranged with their axes parallel and spaced approximately at the four corners of a square, a cylindrical chamber being provided at one end of the group of cylinders having its axis parallel and positioned centrally relatively to the axes of the four cylinders and having near one end an inlet port and near the other an exhaust port and in its side wall four ports which communicate one with each cylinder, four valves one for each cylinder controlling the communication between the ports in the cylindrical chamber and such cylinders, means for operating these valves, pistons in the cylinders, pitmen extending therefrom, a transverse shaft at the pitman end of the cylinders in a plane that lies approximately midway between two of the cylinders, two rocking-beams on this shaft, means for operatively connecting the beams and pitmen, a rotary valve mounted in the cylindrical chamber and having its axis of rotation concentric with the axis of the chamber, such valve comprising a diaphragm $H^*$ that divides the valve chamber along a plane approximately at right angles to the axis of rotation and having a lug or pocket ($H'$) whereof one face bears against the wall of said chamber and is provided with a port that registers with the ports in the chamber and communicates with the upper portion of the chamber, substantially as set forth.

15. In an internal combustion engine the combination of, four working cylinders arranged with their axes parallel and spaced approximately at the four corners of a square, a cylindrical chamber being provided at one end of the group of cylinders having its axis parallel and positioned centrally relatively to the axes of the four cylinders and having near one end an inlet port and near the other an exhaust port and in its side wall four ports which communicate one with each cylinder, four valves one for each cylinder controlling the communication between the port in the cylindrical chamber and such cylinders, means for operating these valves, pistons in the cylinders, pitmen extending therefrom, a transverse shaft at the pitman end of the cylinders in a plane that lies approximately midway between two of the cylinders, two rocking-beams on this shaft, means for operatively connecting the beams and pitmen, a rotary valve mounted in the cylindrical chamber and having its axis of rotation concentric with the axis of the chamber, such valve comprising a diaphragm $H^*$ that divides the valve chamber along a plane approximately at right angles to the axis of rotation and having a lug or pocket ($H'$) whereof one face bears against the wall of said chamber and is provided with a port that registers with the ports in the chamber and communicates with the upper portion of the chamber, and a baffle ($H^8$) on the rotary valve, so situated as to cover each port as its cylinder is about to complete its exhaust, substantially as set forth.

16. In an internal combustion engine the combination of, four working cylinders arranged with their axes parallel and spaced approximately at the four corners of a square, a cylindrical chamber being provided at one end of the group of cylinders having its axis parallel and positioned centrally relatively to the axes of the four cylinders and having near one end an inlet port and near the other an exhaust port and in its side wall four ports which communicate one with each cylinder, four valves one for each cylinder controlling the communication between the ports in the cylindrical chamber and such cylinders, means for operating these valves, pistons in the cylinders, pitmen extending therefrom, a transverse shaft at the pitman end of the cylinders in a plane that lies approximately midway between two of the cylinders, two rocking-beams on this shaft, means for operatively connecting the beams and pitmen, a rotary valve mounted in the cylindrical chamber and having its axis of rotation concentric with the axis of the chamber, such valve comprising a diaphragm $H^*$ that divides the valve chamber along a plane approximately at right angles to the axis of rotation and having a lug or pocket ($H'$) whereof one face bears against the wall of said chamber and is provided with a port that registers with the ports in the chamber and communicates with the upper portion of the chamber, a shield ($h^8$) on the rotary valve situated to receive the impingement of the exhaust gases as they escape from the ports, and a heat insulating layer between this shield and the valve, for the purpose set forth.

In testimony whereof we have signed our names to this specification in the presence of two subscribing witnesses.

WILLIAM JOHN ROBB.
WALTER HENRY WELCH.

Witnesses:
A. M. HAYWARD,
WALTER H. DERRIMAN.